INVENTORS
YOSHINOBU TATSUZAWA,
KOSAKU UCHIDA

BY Stevens, Davis, Miller & Mosher
ATTORNEYS

DECODERS

INVENTORS
YOSHINOBU TATSUZAWA,
KOSAKU UCHIDA

BY Stevens, Davis, Miller & Mosher
ATTORNEYS

DECODERS

Filed Feb. 13, 1968

INVENTORS
YOSHINOBU TATSUZAWA,
KOSAKU UCHIDA

BY Stevens, Davis, Miller & Mosher
ATTORNEYS

INVENTORS

YOSHINOBU TATSUZAWA,

KOSAKU UCHIDA

BY Stevens, Davis, Miller & Mosher

ATTORNEYS

1

3,553,685
DECODERS

Yoshinobu Tatsuzawa, Daito-shi, and Kosaku Uchida, Osaka, Japan, assignors to Matsushita Electric Industrial Co., Ltd., Osaka, Japan, a corporation of Japan Continuation-in-part of application Ser. No. 333,143, Dec. 24, 1963. This application Feb. 13, 1968, Ser. No. 705,114
Claims priority, application Japan, Dec. 28, 1962, 37/59,698
Int. Cl. G08c *19/28*
U.S. Cl. 340—347 3 Claims

ABSTRACT OF THE DISCLOSURE

A decoder comprising a shift register having a plurality of stages and means operative in response to a read-out and write-in pulse for shaping and transmitting the pulse into the shift register for writing "1" into a first stage thereof. Means are also provided to be operative in response to two types of pulses succeeding the read-out and write-in pulse for separating the pulses from each other and shaping the separated pulses to produce two systems of shift pulses. Further means are provided for selectively applying the shift pulse of either system to respective stages of the shift register in accordance with the predetermined code whereby "1" written in the first stage can be successively shifted to the second and third stages of the shift register.

The present application is a continuation-in-part of application Ser. No. 333,143, filed Dec. 24, 1963, now abandoned.

The present invention relates to decoders for use in digital circuits.

The decoders mentioned above refer to devices which read out a code constituted by the arriving order of positive and negative pulses. The total number of pulses contained in the code is predetermined. For example, the code may be constituted in the following manner; a positive pulse followed by a negative pulse, a positive pulse and a negative pulse. Four pulses are contained in the code and the arriving order of pulses is positive-negative-positive-negative. Another code could be constituted by the arriving order of negative-positive-positive-negative. Adding to the coding pulses, which constitute the code in the above-mentioned manner, a particular pulse must be used for reading out the code. This pulse is generally called "read-out pulse" or specifically called "read-out and write-in pulse" in the present invention. The read-out pulse appears in the space between a first sequence of coding pulses and the next sequence of coding pulses, and has a sufficient pulse width to be discriminated from the coding pulses in the decoder. Although a coding pulse may not be used as the read-out pulse, the read-out pulse may be used both as the read-out pulse and the last coding pulse in the sequence of coding pulses.

The pulse code which is constituted in the manner mentioned above is usually applied to selective calling devices. For example, a calling transmitter sends a sequence of pulses containing coding and read-out pulses into a common medium, which may be wireless. Many subscribers belong to the common medium and each of them has a receiver which contains a decoder. The decoder can read out only its own code. When the calling transmitter sends out a sequence of pulses, which has a certain code, only one subscriber can read out such code, that is, only one subscriber is called out. Other subscribers may receive the sequence of pulses but cannot find their own code in it, and so they are not called out.

2

An object of the invention is to provide a decoder which can stably and accurately read out the code which is mentioned above.

The means for accomplishing the foregoing objects and other advantages, which will become apparent to those skilled in the art, are set forth in the following specification and claims, and are illustrated in the accompanying drawings dealing with a basic embodiment of the present invention. Reference is made now to the drawings in which:

Figures 1, 2, 3, 5:
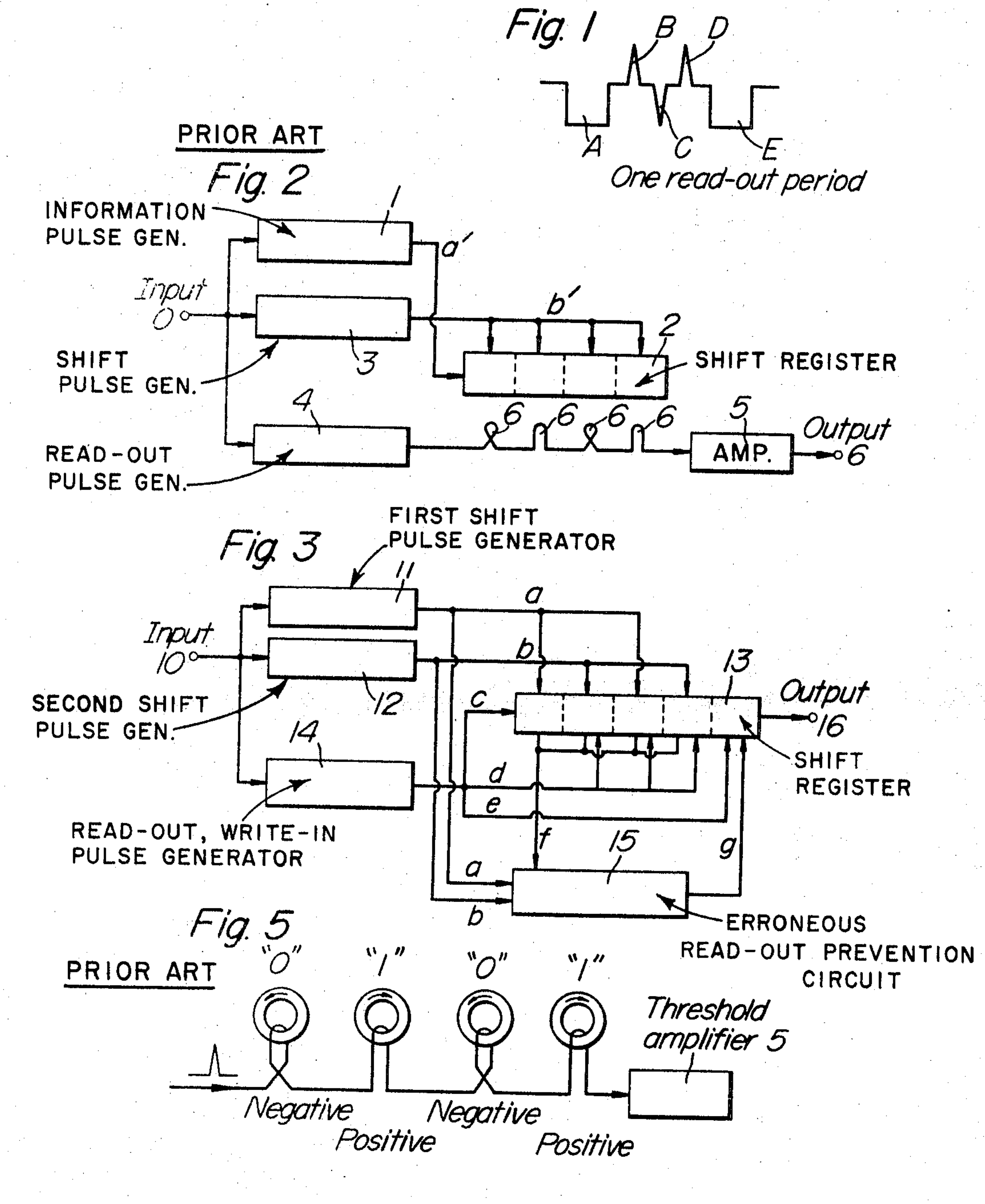
FIG. 1 is a waveform of a code used in both the decoders embodying the invention and those of a conventional design.
FIG. 2 is a block diagram of one form of a conventional decoder.
FIG. 3 is a block diagram of an embodiment of the inventive decoder.
FIG. 5 is a diagram for explaining read-out process in the conventional decoder.

One form of conventional decoders was disclosed in the RCA Review issued in March 1959. In the cited decoder, a code such as is shown in FIG. 1 is used, which comprises a train of pulses arranged in the order of a positive pulse B, negative pulse C and positive pulse D, followed by a negative read-out pulse E having a wider pulse width. In this code, one read-out period is formed by a succession of the positive, negative, positive pulses and negative read-out pulse.

A code is formed by the order in which positive and negative pulses arrive. However, the time interval between the arrival of a positive pulse and a negative pulse and the pulse width have nothing to do with the formation of the code. The read-out pulses, however, are given a width much greater than that of other pulses constituting a code so that the former pulses may be discriminated from the latter pulses in decoding.

While the number of pulses constituting the code during one read-out period is to be determined by the quantity of information, that of the example shown in FIG. 1 is taken to be four, for the sake of simplicity. They are: pulse B, pulse C, pulse D and a read-out pulse E. This latter pulse is added thereto because it also works as a negative pulse and is a component of the code.

Figure 4:
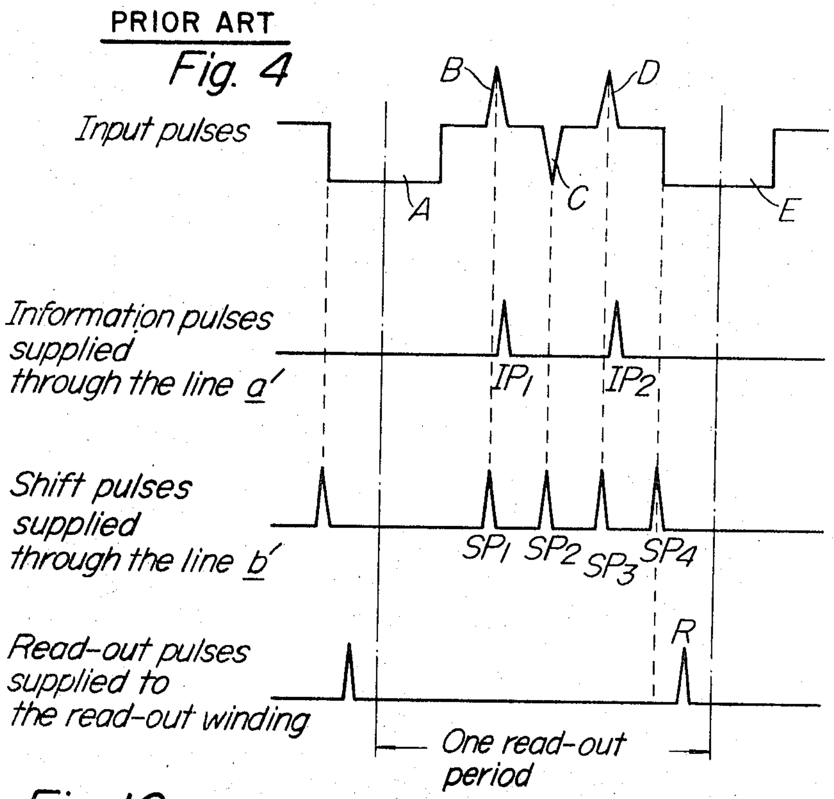
PRIOR ART Fig. 4
FIG. 4 is a waveform of a pulse sequence for use in explaining the conventional decoder.

In order to decode such a code, an arrangement such as is shown in FIG. 2 is used in a conventional decoder. In FIG. 2 an information pulse generator 1 is used to separate only the positive pulse which is admitted from an input terminal 0 and shapes the same to generate an information pulse. This information pulse is used as an input pulse into a shift register 2 through a line *a'*. A shift pulse generator 3 is operative in response to any of the positive and negative pulses, including a read-out pulse, to invariably generate a positive pulse which is used as a shift pulse applied to the shift register 2 through a line *b'*. Of course, a suitable delay time is provided between the shift pulse and an information pulse, as indicated in FIG. 4. Four shift pulses are presented in FIG.

4 to conform with the number of the pulses constituting a code. The read-out pulse E in the top row in FIG. 4 is separated, by the read-out pulse generator 4 in FIG. 2, from the pulses having a smaller width and is also shaped into a read-out pulse R, as shown in the bottom row in FIG. 4. The shift register 2 used in the arrangement comprises memory cores, and when impressed according to the generally employed process, the cores possess two stats, or state "1" and state "0," by which a code can be stored in a memory. The number of stages in the shift register 2 is so determined as to correspond with the number of pulses constituting a code. More particularly, four stages are provided in the present example. As is well known, a shift register is a means by which the state "1" or "0" in a certain stage is shifted to the next stage at the arrival of every shift pulse.

Assume that the pulses constituting a code arrive in the order of positive-negative-positive and negative (read-out) as shown in FIG. 1 or in FIG. 4.

(A) Also assume that at first all the stages in the shift register are in the state "0." Now, by the arrival of the first positive pulse B, the shift pulse $SP_1$ as shown in FIG. 4 is delivered to the line *b'* in FIG. 2. However, since all the stages in the shift register are in the state "0," the state of each stage is not subjected to change by the arrival of the pulse $SP_1$. Next, an information pulse $IP_1$, shown in FIG. 4 generated by the same first pulse B, is delivered to the line *a'* in FIG. 2 after a short interval of time from the arrival of $SP_1$. This information pulse $IP_1$ sets the first stage in the shift register 2 to the state "1," hereby the states of the stages in the register are arranged in the order of "0," "0," "0," "1," respectively, as viewed from the last stage.

(B) Then, by the arrival of the negative pulse C, the shift pulse $SP_2$ is delivered. As a result, the state "1" which has, until the arrival of pulse C, been registered in the first stage is now shifted to the second stage. At the same time, the first stage is reset to "0." Pulse C, being negative, does not cause an information pulse to be generated and, therefore, the first stage in the shift register is not set to "1" during the subsequent moment. Thus, the states in the stages in the shift register are arranged in the order of "0," "0," "1," "0," respectively, as viewed from the last stage.

(C) Then by the arrival of the positive pulse D, the shift pulse $SP_3$ is generated and the state in each of the stages is shifted to the next stage, respectively. Immediately after this shift, an information pulse $IP_2$ arrives and sets the first stage in the shift register to "1," whereupon the states in the stages are in the order of "0," "1," "0," "1," respectively, from the last stage.

(D) Then, at the arrival of the negative read-out pulse E, the shift pulse $SP_4$ is generated by the front edge of the former, and as a result, the state in each of the stages is shifted to the nexe stage, respectively. Then, the stages of the shift register 2 are correspondingly driven to take the state '1," state "0," state "1" and state "0" successively from its last stage, and the code is thereby stored.

It is to be noted at this time that even if extra pulses should arrive prior to the arrival of a predetermined number of pulses which are to arrive before the read-out pulse, such extra pulses will be driven out by those pulses subsequently arriving, because the number of the stages in the shift register is limited and accordingly the information carried in by such extra pulses will be erased. After all, only the information carried by the predetermined number of pulses arriving before the read-out pulse will be effectively stored to await the arrival of the read-out pulse. On the other hand, the read-out pulse is of a great pulse width and is separated and shaped in a read-out pulse generator 4 and then impressed on read-out windings 6 of the shift register 2. The read-out windings of the register are wound to have different polarities such as positive-negative-positive-negative successively from its last stage so as to correspond with the code and are connected in series. It is to be assumed that a positive winding will magnetize the core to bear the state "1," or clockwise by the read-out current, whereas a negative winding will magnetize the core to become "0," or counterclockwise by the read-out current. In this way, the state of the core in each stage, as well as the polarity of the winding, will become as indicated in FIG. 5, and in such condition they await the arrival of the read-out pulse. When a positive winding is applied to the core while it is in the state "1," and a negative winding is applied to the core which is in the state "0," the state of the core, in each case, will not be inverted by the flow therethrough of the read-out current. Accordingly, no reaction is caused by the read-out current. Alternatively, however, when, for example, a negative winding is applied to the core of state "1," the state will be inverted to "0" by the read-out current. Hence, when any of the states "1" and "0" in the shift register is inverted, a read-out current is made to flow through the read-out windings and the reaction caused thereby will limit the flow of the read-out current When, on the contrary, the code of the arrived pulses coincides with the code of the read-out windings, no state in the register will be inverted and the absence of reaction will result in a greater flow of the read-out current. The intensity of the read-out current is more clearly distinguished by being applied to a threshold amplifier 5 and delivered as an output to an output terminal 6 so that coincidence or discord of the code can thereby be clearly indicated. The constitution and operation of the conventional decoder is as outlined in the above description.

However, the conventional arrangement has the following drawbacks: (1) Since the memory cores are generally devoid of an ideal rectangular hysteresis loop, shift registers with a greater number of stages or shift registers with a greater number of read-out windings will work inaccurately because a ratio between the read-out current, in the case of coincidence and in the case of discord, will become smaller. Further, since the characteristics of the memory cores are affected by temperatures, superposition of these two effects will result in more and more pronounced inaccuracy; (2) Read-out is effected whenever coincidence is made in the code including a predetermined number of pulses, three in the example, arriving before a read-out pulse. Therefore, when an extra pulse, such as an external noise, is mixed in a pulse train of different codes, coincidence may take place in the code of the predetermined number of pulses before the read-out pulse and read-out of such code may be effected. This means that there is a possibility of erroneous read-out due to inclusion of such external noise; and (3) When a noise pulse is incessantly mixed in the pulses, as in the case of radio transmission, the shift register would frequently operate even though there is no code in the input pulses into the decoder. Thus, useless current consumption will increase.

The present invention intends to obviate such difficulties encountered by the conventional arrangement described above. Hereinunder, the constitution and operation will be explained with reference to a preferred embodiment of the invention illustrated in FIG. 3.

Figure 6:
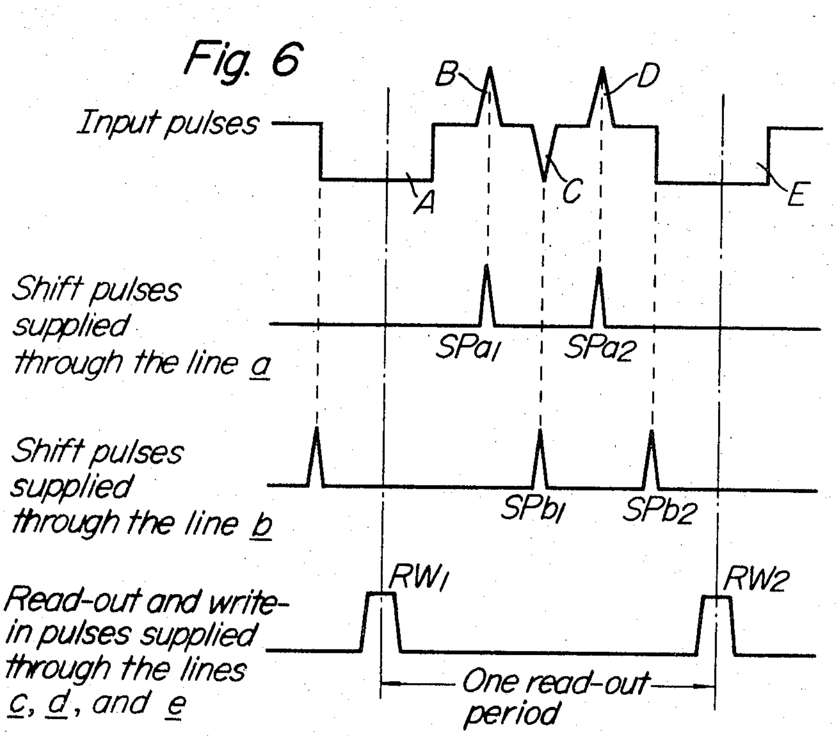
FIG. 6 is a waveform of a pulse sequence for use in explaining the decoder according to the invention.

In FIG. 3, a first shift pulse generator 11 is operative, in response to only a positive pulse, to generate a shift pulse which is supplied to a first and a third stage of a shift register 13 by way of a line *a*. A second shift pulse generator 12 is operative in response to a negative pulse alone to generate a shift pulse, which is supplied to the second and fourth stages of the shift register 13 by way of a line *b*. A read-out and write-in pulse generator 14 is operative in response to only a read-out and write-in pulse of a wider pulse width to separate and shape it into a pulse, which is also called a read-out and write-in pulse for convenience sake and is supplied to lines *c*, *d* and *e*. The order in which these pulses are delivered to the respective lines has been described above and is as indicated in FIG. 6. The read-out and write-in pulse E, being endowed also with the nature of a negative pulse which is a component of a code, will, by the action of its front edge, deliver the shift pulse $SP_{b2}$ to line *b*. In the case of FIG. 6, then, the number of the pulses which constitute a code is also four. What has been called a read-out pulse in FIG. 4 is called a read-out and write-in pulse here in FIG. 6. This is because, in the present invention, this pulse reads-out "1" in the last stage of the shift register and at the same time writes "1" in the first stage of the shift register. The shift register 13 includes a number of stages equal to the number of pulses in the code plus a last stage. For the example of the input pulses indicated in FIG. 6, the total number of stages will be five. The shift pulses are applied to the stages of the shift register 13, except the last stage, in such a manner that the line *a* or *b* is selected depending on the code. This is the method of constituting a code in the inventive decoder.

More precisely, when a train of pulses constituting the code arrive at the decoder in the order of the positive B, negative C, positive D and negative E (read-out and write-in pulse) and such code is to be read out, the shift pulses for the first and third stages of the shift register 13 are applied through the line *a*, while the shift pulses for the second and fourth stages are applied through the line *b*. The line *c* serves to set the first stage of the register to state "1" by means of the read-out and write-in pulse, while the line *d* serves to clear the subsequent stages, including the second stage, or drive them to state "0." The line *e* serves to deliver "1" in the last stage of the register to an output terminal 16 to provide an output of the decoder and at the same time to reset the last stage to state "0." It will thus be understood that the lines *c*, *d* and *e* are fed out of the same read-out and write-in pulse generator 14 and, as a matter of fact, though functioning differently, they are distributed from the same output line. A line *f* is fed from all the stages in the register, except the last stage, to an erroneous read-out prevention circuit 15. The function of the line *f* is to transmit to the circuit 15 the information that the state "1" or "0" in any stage of the register, except the last stage, has been inverted. In other words, the information that the state "1" in any stage of the register, except the last stage, has been shifted to the next stage and that the state of the previous stage has been inverted to the state "0" is sent to circuit 15. Or more definitely, a pulsive current (hereinafter referred to as an operating current) flows through the line *f* when the state in at least one stage anywhere in the shift register 13, except the last stage, is inverted. This operating current is utilized as an information of inversion.

The device according to the present invention operates in the following manner. The following operation takes place successively when the train of pulses shown in FIG. 1 arrives at the input terminal 10 of FIG. 3. In the following description, FIG. 6 will also be utilized when necessary.

(A) At first, by the arrival of the read-out and write-in pulse A, the read-out and write-in pulse RW, is delivered to the lines *c*, *d* and *e*, and the first stage of the shift register 13 is driven to state "1" through the line *c*, and the subsequent stages, including the second stage, are cleared to state "0" through the lines *d* and *e*. The state in each of the stages of the register has now been reset to "1," "0," "0," "0," respectively, from the first stage.

(B) Then, by the arrival of the positive pulse B, the shift pulse $SP_{a1}$ is delivered to the line *a* by the shift pulse generator 11, and "1" in the first stage of the shift register 13 is shifted to the second stage. At this moment, the above-mentioned operation current flows through the line *f*. All stages, except the second stage of the register, are reset to "0." The state in each of the stages of the shift register then is "0," "1," "0," "0," "0," respectively, from the first stage.

(C) Subsequently, by the arrival of the negative pulse C, the shift pulse $SP_{a1}$ is delivered to the line *b* by the shift pulse generator 12, and "1" in the second stage of the register is shifted to the third stage. Also, at this moment an operating current flows through the line *f*. Therefore, the digits "0", "0", "1", "0", "0" are now written in the shift register 13.

By the above sequence, when the code of the train of pulses coincides with the code of the shift register 13, "1" written in the first stage by the read-out and write-in pulse A is successively and ceaselessly shifted to the subsequent stages each time the positive or negative pulse arrives in the predetermined sequence, namely positive $B(SP_{a1})$ - negative $C(SP_{b1}$ - positive $D(SP_{a2})$ - negative $E(SP_{b2})$, until finally it is shifted to the last stage of the shift register 13, in other words, until the state in each of the stages has been reset to "0," "0," "0," "0," "1," respectively.

(D) By the arrival of the final read-out and write-in pulse E, the pulse $RW_2$ is delivered from the read-out and write-in pulse generator 14 and fed through the line *e* to trigger the last stage of the shift register 13 to thereby read out "1" therein which is delivered as an output to the output terminal 16. At the same time, the first stage of the register is driven to state "1" and the other stages are reset to stage "0," as described above, by the lines *c* and *d*. The decoder now awaits the arrival of a subsequent code.

The above is the normal operation which is effected when the code coincides with the predetermined one.

(E) When there is discord between the code of the input pulses and the predetermined one, for example, when a negative pulse arrives first in lieu of the first positive pulse B in FIG. 1, the decoder operates in a manner different from the above operation, and "1" in the first stage of the shift register 13 would not shift to the second stage, because the first stage is not connected to the line *b* and therefore the shift pulse generated by the negative pulse is not applied to the first stage, though the shift pulse generated by the negative pulse is delivered to the line *b*. Thus, by the fact that "1" in the shift register 13 has not shifted (that is the state in any stage has not been inverted) in spite of feeding the shift pulse, it is possible to detect an error in the code. The erroneous read-out prevention circuit 15 acts, by its logical circuit when an operating current flows from the register to the line *f* to determine when the shift pulse exists in the line *a* or *b*. When there is no operating current flowing in the line *f*, the circuit 15 delivers an output to a line *g* to thereby temporarily stop the function of, for example, the last stage of the shift register 13 and to reset the register. Thus, the erroneous read-out prevention circuit 15 is operative to prevent read-out of the erroneous code.

Figure 7:
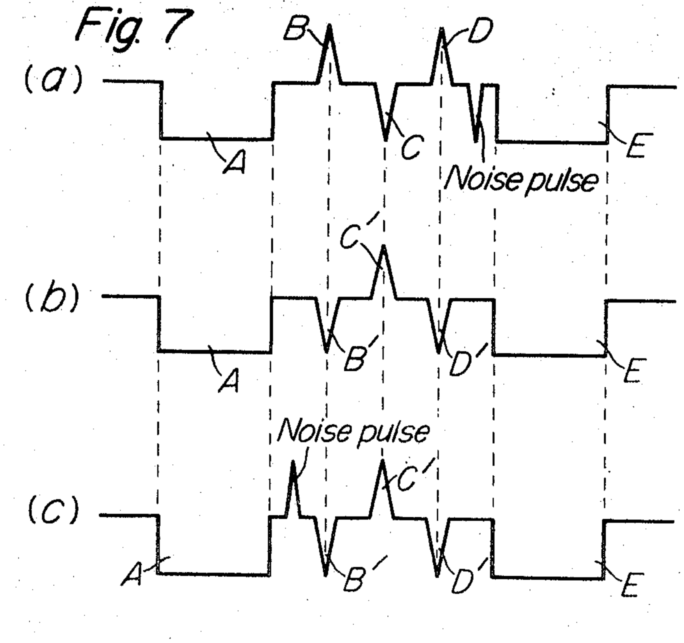
FIG. 7 is a waveform of a pulse sequence for use in explaining the function of preventing erroneous read-out in the invention.

(F) Consider that the pulses B, C and D arrive in succession before a read-out and write-in pulse and, due to the coincidence of the code with the predetermined code of the register, the decoder waits for a successive read-out and write-in pulse E, with "1" shifted to the fourth stage of the shift register 13. Assume then that a negative pulse due to noise, with a pulse width not as wide as the read-out and write-in pulse comes in lieu of the read-out and write-in pulse. In other words, assume the case to be the one as indicated in FIG. 7(a). By the arrival of this negative noise pulse, a shift pulse is delivered to the line *b*, and the state "1" in the fourth stage is shifted to the last stage. However, the shift pulse ($SP_{b2}$ in FIG. 6), which is delivered to the line *b* by the action of the front edge of the read-out and write-in pulse that arrives in succession, becomes superfluous. If the total number of the shift pulses which are delivered for any reason to the line *a* and the line *b* during one read-out period is greater than the predetermined number, four, as noted in the example just now mentioned, the code which would be formed by the predetermined number of pulses following the read-out and write-in pulse among the excessive number of pulses, has to be regarded as being an erroneous one even when such code coincides with the predetermined code. Therefore, this code must not be delivered as an output from the decoder. The reason for the foregoing description will be explained in further detail as follows. Let us assume that a completely different code comprising a negative pulse B′, a positive pulse C′, a negative pulse D′ and a negative read-out and write-in pulse E similar to those in FIG. 7 (also FIG. 6) arrive, In this case there will be no output from the decoder because of the discord of the code. Next, assume that a positive noise pulse arrives immediately before the negative pulse B′, as indicated in FIG. 7(c). In this case also no output should be delivered from the decoder. Since the pulses in FIG. 7(c) are disposed in the same pattern as those in FIG. 7(a), occurrence of possible coincidence of the code for a part of the pulses in FIG. 7(a) should not lead to the delivery of an output from the decoder. In the case that a coincidental code is formed by a train of the predetermined number of pulses arriving in succession to a read-out and write-in pulse and then an extra pulse is delivered to the line *a* or to the line *b*, the decoder must not deliver an output. The method of attaining this purpose will be described below. Arrival of such extra pulse will not shift "1" in the last stage, since the last stage of the shift register is not connected either to the line *a* or to the line *b*. Therefore in this case, it is possible to again make use of the fact that the operating current does not flow through the line *f* in spite of the existence of the shift pulse in the line *a* or *b*, just as in the previous case, wherein the error takes place in the code. The erroneous read-out prevention circuit 15 can be operated in a similar manner to inhibit the erroneous read-out. According to the invention, when pulses of more than a predetermined number arrive and even if the code with a predetermined number of pulses therein coincides with the predetermined code of the register, there is utterly no possibility of erroneous read-out. Therefore, it will be apparent that the invention can effectively prevent the erroneous operation from taking place, in contrast to the conventional arrangement wherein the possibility of erroneous read-out exists when there is an extra pulse.

Next, the operation of a circuit will be described based on the example in FIG. 8 and also by referring to FIG. 6.

Figure 9:
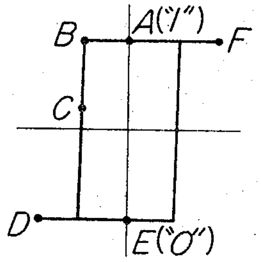
FIG. 9 is a diagram of hysteresis characteristics of a magnetic core used in the inventive decoder.
Figure 8:
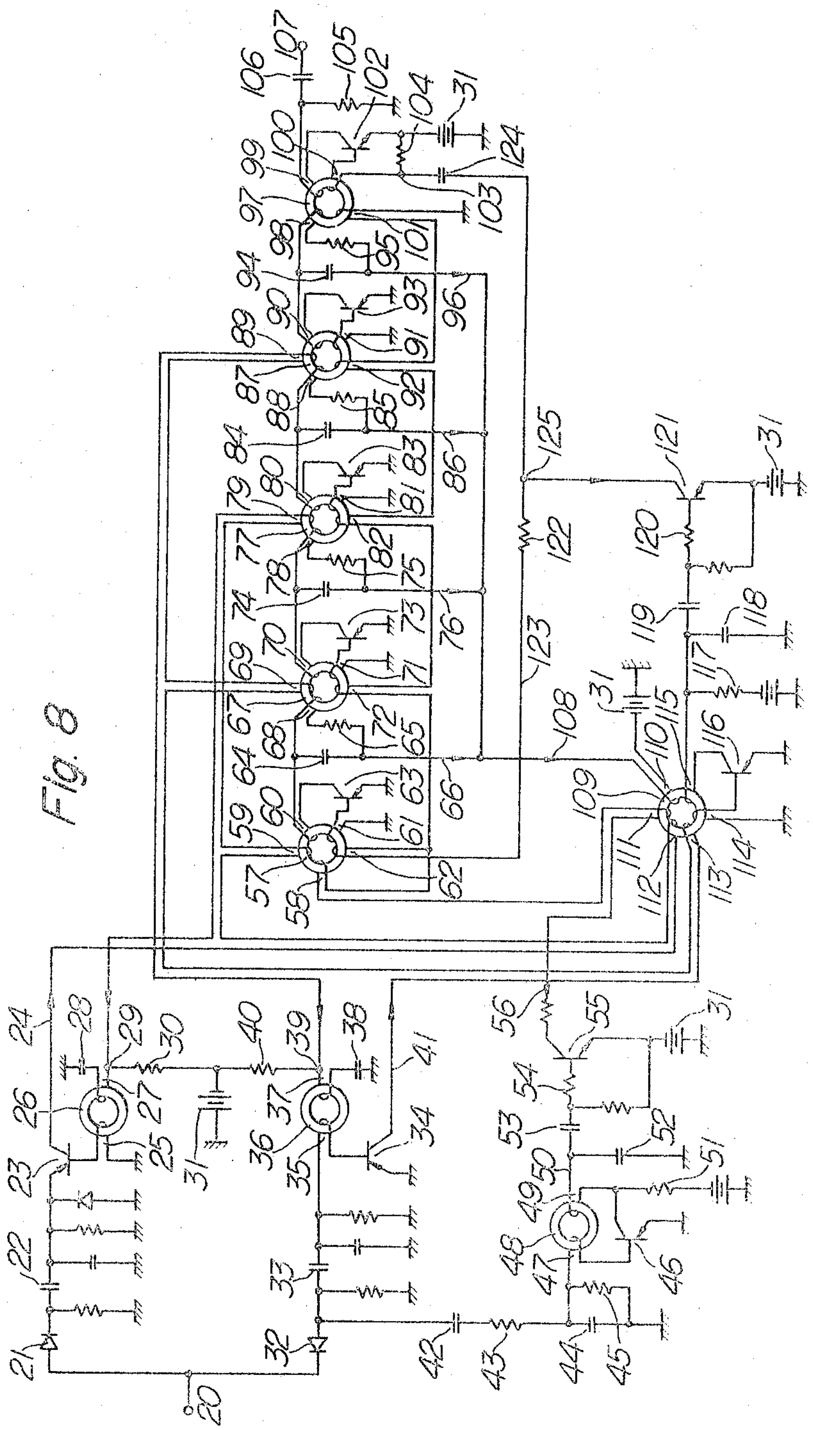
FIG. 8 is a circuit diagram of an embodiment of the invention.

When a train of input pulses, such as shown in FIG. 6, is delivered to an input terminal 20 of FIG. 8, the positive pulses in the train will, via a diode 21 and a condenser 22, drive the emitter of PNP type transistor 23 to positive. The transistor 23 then is set to the state "ON," and electric current flows in the direction of the arrow through the line 24 connected to the collector of the transistor. The line 24 runs back to a point 29 via respective windings 112, 59 and 79 of cores 109, 57 and 77. The line extends from point 29 to the winding 27 of a core 26 and is further connected to a condenser 28. As is the case with all other cores, the core 26 may have a substantially rectangular hysteresis loop, as shown in FIG. 9, and may have two stable states of "1" and "0." Here, the clockwise magnetization of a core is to be called "setting to the state '1'," and the counterclockwise magnetization, "resetting or clearing to the state '0'." When a power source, battery 31, is first operatively connected, the condenser 28, via a resistance 30 and the winding 27, is charged negative. This charging current magnetizes the core 26 clockwise. In other words, the core 26 is set to "1." Similarly, both cores 36 and 48 are set to "1."

Now, by the arrival of a positive pulse, the transistor 23 is set to "ON" and the current that flows in the direction of the arrow through the line 24 returns to the point 29 and, via the winding 27, charges the condenser 28 positive. The current flowing at this moment drives the core counterclockwise, namely, in the direction of ABC in FIG. 9, by the action of the winding 27. If this drive should become more intensive than a certain critical value, namely, above the point B in FIG. 9, it will reach the vertical linear portion C of the hysteresis loop and will cause a change in the magnetic flux in the core and will thus create an electro-motive force (hereinafter referred to as E.M.F.) in the winding 25 of the same core 26. This E.M.F., created in the direction of the base current, is made to flow from the base of the transistor 23 to the winding 25. Accordingly, the current that flows through the line 24, connected to the collector, is made greater and greater by the amplifying action of the transistor 23, with the result that the core 26 is driven more intensively counterclockwise until it reaches the point D in FIG. 9. When the drive of the core reaches the point D, the magnetic flux within the core is no longer subjected to a change. Also, the coupling between the winding 27 and 25 disappears. Thus, the line 24 will no longer be charged with current. After all, the current that flows through the line 24 is a pulsive current of a narrow width (about 3 $\mu$s) which is produced by the triggering of the positive pulse delivered to the input terminal. The condenser 28 is charged positive by the pulsive current that flows through the line 24. When the pulsive current stops, the condenser 28 is discharged via the winding 27 and the resistance 30. This discharge current again drives the core 26 clockwise, namely, in the direction of DEF in FIG. 9, and sets the core to the state "1," thereupon to wait for the next positive pulse to arrive.

When a negative pulse is delivered to the input terminal 20, the pulse will drive the base of the transistor 34 to negative, via the diode 32, the condenser 33 and the winding 35; and a current begins to flow in the direction of the arrow through the line 41. This current returns to the point 39 and charges the condenser 38 positive via the winding 37. At this moment, the core 36 is driven counterclockwise by the winding 37, creating an E.M.F. in the winding 35. This E.M.F. causes the amount of the current in line 41 to increase sharply. When, in the course of time, the current flow stops, as a result of the saturated core flux, the condenser 28 will discharge. Thus, the core is again set to "1" and waits for the next negative pulse to arrive.

When a negative read-out and write-in pulse such as the one indicated by A or E of FIG. 6 arrives, the transistor 34 is first triggered, in the manner described above, and a pulsive current flows through the line 41. Apart from this, however, the following operation is started at the same time.

The negative read-out and write-in pulse, via the diode 32, the condenser 42 and the resistance 43, charges the condenser 44 negative. Since the resistance 43 and the condenser 44 form an integrating circuit having an appropriate time constant, there is little change in the terminal voltage of the condenser 44 even if a pulse of narrow width should arrive. When a pulse of a wider width arrives, however, the voltage will rise to a level sufficient for setting the transistor to "ON." This is the way the read-out and write-in pulse is distinguished from other pulses of smaller widths. The resistance 45 is provided to prevent the transistor 46 from staying in the "ON" state for an excessive length of time by appropriately discharging the condenser 44 which has been charged till then. Now, by the arrival of the read-out and write-in pulse, the transistor is set to "ON" and a current flows from its collector to the winding 49 and to the line 50, and the condenser 52 is charged positive. At this moment, the core 48 is driven counterclockwise, creating an E.M.F. in the winding 47. This force, in turn, accelerates the increase of the collector current of the transistor. With the flux of the core 48 being saturated, the current ceases flowing through the line 50 and discharge from the condenser 52, via the winding 49 and the resistance 51, is started. Thus, the core is again set to "1." The terminal voltage of the condenser 52 during this course is added to the base of the n-p-n transistor 55 through condenser 53 and the resistance 54 and a pulsive current flows through the line 56, connected to its collector, in the direction of the arrow. This pulse is provided with a width wider than that of the pulse which runs through the line 24 or the line 41. The reason for the wider width will be described later on.

The lines 24, 41 and 56 in FIG. 8 correspond respectively to the lines *a*, *b* and *c* of FIG. 3. The pulsive current which flows through the lines 24, 41 and 56 corresponds to $SP_{a1}$ (and $SP_{a2}$) and $RW_1$ (and $RW_2$), respectively.

Next, description will be made of the operation where an output is delivered from the decoder for the code which has been read out from a group of arriving pulses constituting the code.

(A) First, by the arrival of the read-out and write-in pulse A, a read-out and write-in pulse $RW_1$ is delivered to the line 56 in the direction of the arrow. The line 56 is connected in series to the windings 111, 58, 72, 82, 92 and 101. By the pulse $RW_1$, the core 109 is set to "1," and the core 57 is set (or written in) to "1," and at the same time the cores 67, 77, 87 and 97 are reset (or cleared) to "0."

(B) Next, by the arrival of the positive pulse B, a shift pulse $SP_{a1}$ is delivered to the line 24 in the direction of the arrow. The line 24 being connected to the shift winding 59 of the core 57, the core 57 which has been set to "1" is driven counterclockwise by the shift pulse $SP_{a1}$. Then a change in the magnetic flux within the core 57 occurs, which creates an E.M.F. in the winding 61, which in turn sets the transistor 63 to "ON." As a result, a current flows through the winding 60, the condenser 64 and the line 66 successively. This current drives the core counterclockwise with a growing intensity through the medium of the winding 60. The result is that the E.M.F. produced in the winding 61 is fed back to sharply increase the collector current in the transistor 63. In due course of time, the flux of the core 57 is saturated and the collector current in the transistor 63 ceases to flow, and the core 57 is reset to the state "0."

The pulsive current which flows during this period of time from the collector of the transistor 63 through the line 66 via the winding 60, is, as stated previously, the operating current of the shift register.

The condenser 64 is charged by the operating current. The condenser is discharged, after the cessation of the operating current, through the winding 68 and the resistance 65. During this period, the core 67 is driven clockwise and is set to "1."

Thus, by the arrival of a positive pulse B, a shift pulse $SP_{a1}$ is delivered to the line 24, and the state "1" which has been in the core 57 in the first stage of the shift register is shifted to the core 67, and the core 57 in turn is reset to "0."

(C) Next, by the arrival of a negative pulse C, a shift pulse $SP_{b1}$ is delivered to the line 41 in the direction of the arrow. Then, by the winding 69, the core 67 which has been set to "1" is triggered and the state "1" in the second stage of the shift register is shifted to the third stage. At this moment, an operating current flows through the line 76.

(D) Next, by the arrival of a positive pulse D, a shift pulse $SP_{a2}$ is delivered to the line 24. Then the core 77 is triggered by the winding 79, and the state "1" in the third stage is shifted to the fourth stage, permitting an operating current to flow through the line 86.

(E) Next, by the front edge of a negative read-out and write-in pulse E, a shift pulse $SP_{b2}$ is delivered to the line 41. Then the core 87 is triggered by the winding 89, and the state "1" in the fourth stage is shifted to the last stage. Also at this moment, an operating current flows through the line 96.

(F) By the arrival of a read-out and write-in pulse E, a read-out and write-in pulse $RW_2$ is delivered to the line 56 in the direction of the arrow. The line 56 being connected to the winding 101 of the core 97 in the last stage, the core 97 which has been set to "1" is triggered to deliver a pulsive current to the collector of the transistor 102. By this pulsive current, a negative pulsive voltage is produced across the resistance 105, and this pulsive voltage is transmitted to the output terminal 107 through condenser 106, and produces an output of the decoder.

Simultaneously, such operation as that described in paragraph (A) is again started, and the arrival of the next code is awaited.

The above is a description of the operation where an output is delivered from the decoder when the code formed by the arrived pulses coincides with the code of the decoder.

Next, description will be made of the operation where the code formed by the arrived pulses is in discord with the decoder code.

(G) The operation until the cores 109 and 57 are set to "1" by the arrival of a read-out and write-in pulse is the same as in the previous case. Then, by the arrival of a positive pulse B, the state "1" which has been in the core 57 is shifted, in the same manner as to the core 67 described in paragraph (B), permitting an operating current to flow through the line 66. This operating current flows from the line 66 to the line 108. The windings 112 and 113 of the core 109, on the other hand, being connected to the lines 24 and 41, respectively, the core 109 tends, when a shift pulse is delivered to the line 24 or the line 41, to be triggered counterclockwise. However, when an operating current flows through the winding 110, a force to magnetize the core 109 clockwise is applied thereto, with the result that the triggering by the windings 112 and 113 is made ineffective. Thus, the core 109 is maintained in the state "1," and keeps the transistor 116 from taking the "ON" state.

Now, let us assume that initially a negative pulse arrives instead of a positive pulse B. A shift pulse is then delivered to the line 41. Since this line 41 is not connected to the winding of the core 57, the core 57 which has been set to "1" is not triggered and no operating current flows through the line 66, nor to the line 108, nor to the winding 110. Therefore, no force is produced to magnetize the core 109 clockwise. Nevertheless, a shift pulse runs from the line 41 to the winding 113. Therefore, the core 109 is easily triggered counterclockwise, causing a change in the magnetic flux, which in turn creates an E.M.F. in the winding 114 which is capable of setting the transistor 116 to the "ON" state. As a result, the collector current from the transistor 116 is made to flow through the winding 115 to the condenser 118. This current increases more and more as it is fed back from the winding 115 to the winding 114. With the subsequent saturation in the flux of the core 109, the current ceases to flow, and the core remains in the state "0." The voltage appearing at the terminal of the condenser 118 during the above period of time is applied to the base of the transistor 121 via the condenser 119 and the resistance 120, making a pulsive current flow in the direction of the arrow.

This clearing pulse is fed, through the resistance 122 and the line 123, to the windings 62, 72, 82, 92 and 101 successively. When the core 57 is set to "1," the core is triggered by the clearing pulse to set the transistor 63 to "ON," and the core 67 in the next stage tends to be set to "1." As the current of the clearing pulse is still present in the winding 72 at this moment, it inhibits the core 67 from being set to "1." Therefore, it is only the core 57 that is cleared to "0" by the clearing pulse. The core 67 still remains in the state of "0." In other words, the shift register is cleared.

Figure 10:
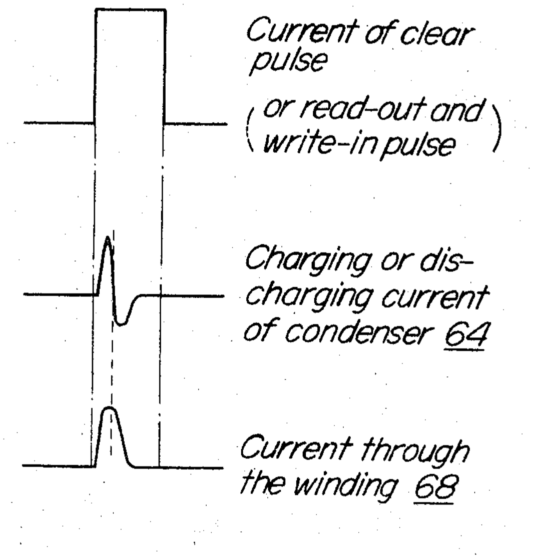
FIG. 10 is a diagram for explaining pulse width of a clear pulse or a read-out and write-in pulse in the inventive decoder.

The clear pulse is provided with a width much wider than that of the pulse of, for example, the current which flows through the winding 68, namely, of the current which works to set the core 67 to "1," as shown in FIG. 10. (The read-out and write-in pulse $RW_1$ (or $RW_2$) also has a width also as wide as that of the clearing pulse because the former is given the role of clearing the second through the last stages.)

The foregoing description is for the operation wherein the core 57, which has been in the state "1," is cleared by the arrival of a negative pulse instead of the positive pulse B. Similarly, when the state "1" is in the core 77 or 87, this state is also cleared in the foregoing manner when a train of pulses of an order different from the predetermined order arrives.

(H) Next, description will be made on the operation where the code formed by a predetermined number of pulses arriving in succession to the read-out and write-in pulse $RW_1$ coincides with the predetermined code and where the state "1" in the first stage has been successively shifted and is now in the last stage, i.e., the state in the last stage is "1" and the state in each of the first to the fourth stages is "0," respectively. If an extra shift pulse is delivered, under the aforementioned condition, no operation current flows through the lines 66, 76, 86 and 96. As a result, the core 109 is triggered by the shift pulse delivered to the winding 112 or 113, permitting a clear pulse current to flow into the collector of the transistor 121. Also, the voltage at point 125 drops momentarily. This pulsive voltage is fed to the base of the transistor 102 via the condenser 124, inhibiting the transistor 102 from being set to "ON." On the other hand, a clearing pulse current flows through the resistance 112 and the line 123 to the winding 101, thereby the core 97 is cleared to "0" from the previous state of "1." In other words, without an output being delivered from the decorder, the last stage in the shift register is cleared.

In the foregoing, the operation of the circuit in FIG. 8 has been described.

As will be clearly understood from the above description, in regard to the preferred embodiment of the invention, the decoder of the invention has the following characteristics:

(A) In the invention, unlike the decoders having conventional shift registers, no read-out windings are used in the shift register to effect the read-out operation. More specifically, the present invention does not judge the coincidence of the code by the amount of the read-out current which flows through the read-out winding of the core in each stage connected in series, but detects whether the state "1" which was written in the first stage has been unmistakably shifted to the last stage at the arrival of every train of pulses which constitute a code. The operation in which the state "1" registered in the first stage is shifted to the second state and then to the third stage is performed with a great stability. Therefore, coincidence and discord of any code can extremely clearly be distinguished, and the decoder of the invention operates extremely stably in spite of any variation in temperature and source voltage. The number of the stages in the shift register may be increased indefinitely.

(B) The decoder of the invention is entirely free from the possibility of erroneous read-out, unlike the conventional devices, even when an external pulsive noise is mixed in with a train of pulses forming a code.

(C) In the present shift register, "1" appears only at one stage during its shifting through the plurality of stages. Therefore, current consumption is less than the conventional decoder wherein many stages in the shift register are simultaneously made to operate.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the meaning and range of equivalency of the claims are therefore to be embraced therein.

We claim:

1. A decoder comprising a shift register having a plurality of stages, means operative in response to a read-out and write-in pulse for shaping and transmitting said pulse into said shift register for writing "1" into a first stage thereof, means for supplying a coded series of at least two types of pulses succeeding said read-out and write-in pulse, means operative in response to said two types of pulses for separating said two types of pulses from each other and separately shaping said separated pulses to produce two systems of shift pulses, and means for selectively applying said shift pulses of either of these systems to respective stages of said shift register in accordance with the constitution of said coded series of pulses, whereby "1" written in the first stage can be successively shifted to the successive stages of said shift register.

2. A decoder according to claim 1, further comprising an additional stage provided in succession to said plurality of stages of the shift register so that the total number of stages is one greater than the number of pulses forming said coded series, said read-out and write-in pulse being applied to said last stage.

3. A decoder according to claim 2, further comprising an erroneous read-out prevention circuit coupled to said plurality of stages of said shift register and said means for producing two systems of shift pulses, said circuit being responsive to first information indicating that the state of at least one of said plurality of stages has inverted and second information indicating that a shift pulse has appeared in either of said two systems of shift pulses whereby said circuit supplies an output pulse to said shift register to reset all the stages thereof while preventing said shift register from generating an output when only said second information is present and said first information is absent thereby avoiding erroneous read-out.

References Cited

UNITED STATES PATENTS 3,217,297 11/1965 Delugeau et al. ______ 340—168

MAYNARD R. WILBUR, Primary Examiner

G. R. EDWARDS, Assistant Examiner